United States Patent
Kim et al.

[11] Patent Number: 6,039,585
[45] Date of Patent: Mar. 21, 2000

[54] CONNECTOR ASSEMBLY WITH SELF ACTIVATING ENVIRONMENTAL SEAL

[75] Inventors: Derek Kim, Northridge; Thomas Lopez, Los Angeles, both of Calif.

[73] Assignee: Reynolds Industries Incorporated, Angeles, Calif.

[21] Appl. No.: 08/814,496

[22] Filed: Mar. 10, 1997

[51] Int. Cl.[7] .................................................. H01R 13/44
[52] U.S. Cl. ........................................ 439/137; 385/139
[58] Field of Search .................................. 439/587, 271, 439/137; 385/81, 86, 87, 62, 70, 73, 94, 139

[56] References Cited

U.S. PATENT DOCUMENTS

| | | | |
|---|---|---|---|
| 3,352,982 | 11/1967 | Walther | 439/137 X |
| 4,180,301 | 12/1979 | Hutter . | |
| 4,411,491 | 10/1983 | Larkin et al. . | |
| 4,606,603 | 8/1986 | Cairns . | |
| 4,696,540 | 9/1987 | Adams et al. . | |
| 4,756,595 | 7/1988 | Braun et al. . | |
| 5,125,056 | 6/1992 | Hughes et al. . | |
| 5,289,345 | 2/1994 | Corradetti et al. . | |
| 5,426,715 | 6/1995 | Moisson et al. . | |
| 5,556,294 | 9/1996 | Hofmeister et al. . | |
| 5,708,745 | 1/1998 | Yamaji et al. | 385/139 X |

*Primary Examiner*—Paula Bradley
*Assistant Examiner*—Daniel Wittels
*Attorney, Agent, or Firm*—Sheppard, Mullin, Richter & Hampton LLP

[57] ABSTRACT

A connector assembly to join two contacts that has a seal assembly comprised of simple, reliable, easily replaceable and inexpensive components. The connector assembly has a female housing that automatically seals a contact therein when the connector assembly is not assembled. The connector assembly includes a male housing, the female housing, an resilient sleeve and a spring. The male housing includes a rigid projection and a longitudinal passageway sized to mount a first contact therein. Like the male housing, the female housing includes a longitudinal passageway sized to mount a second contact therein. The seal assembly includes the resilient sleeve and the spring. The sleeve is mounted about the contact in the female housing and is located so that the spring pinches the sleeve closed when the male and female housings are not connected. During the connection process, a projection on the male housing portion forces the spring to release its engagement with the resilient sleeve so that the sleeve can deform and open into its normal position wherein the first contact can fit inside the sleeve when the connector is assembled.

23 Claims, 14 Drawing Sheets

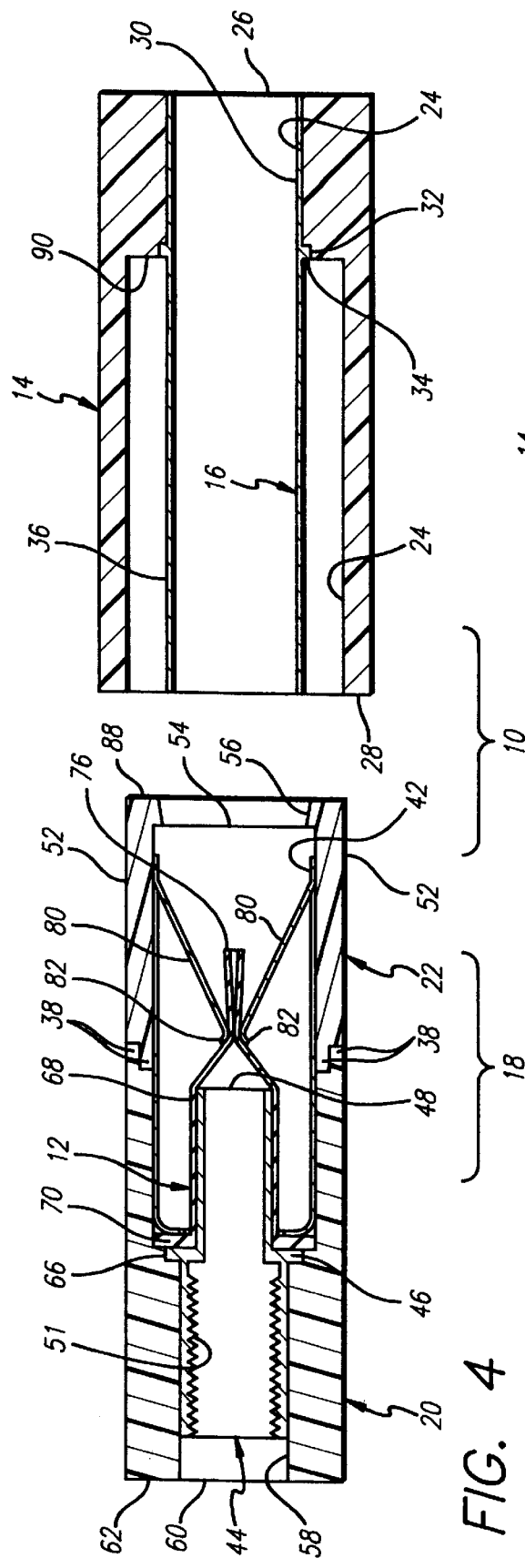
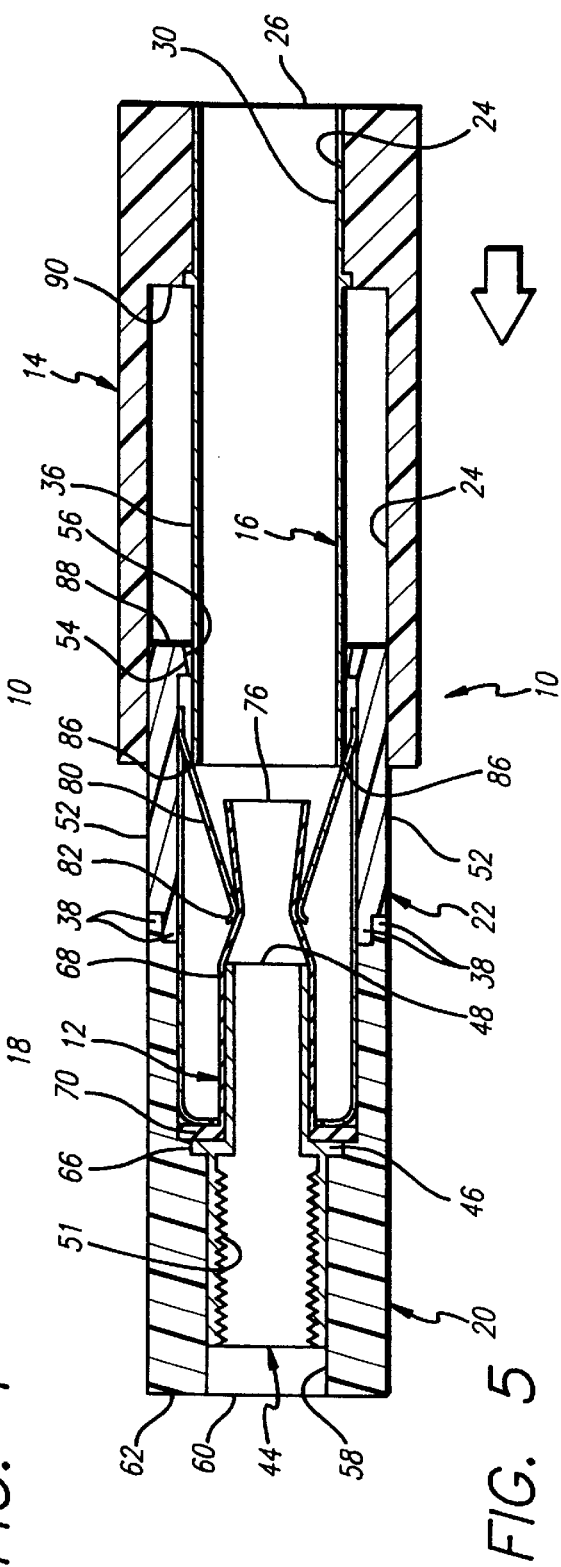
FIG. 4
FIG. 5

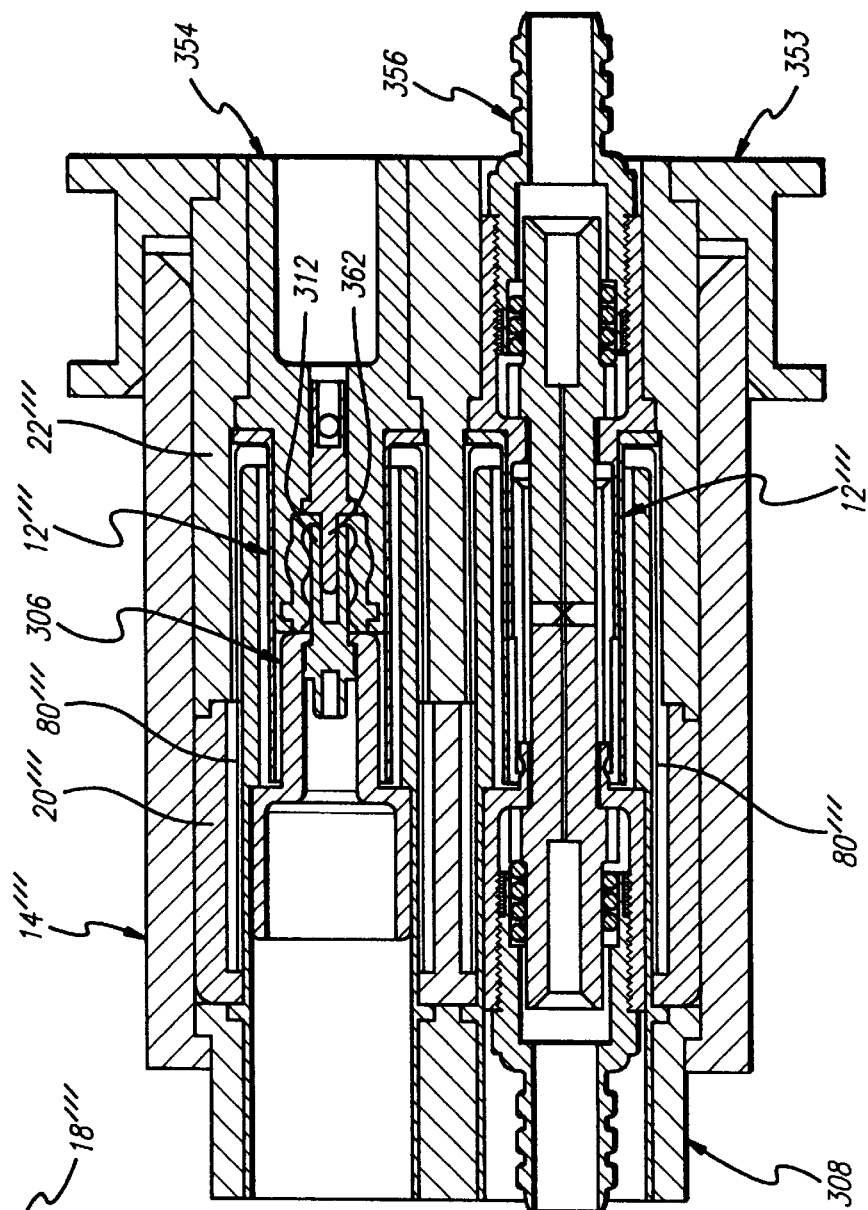
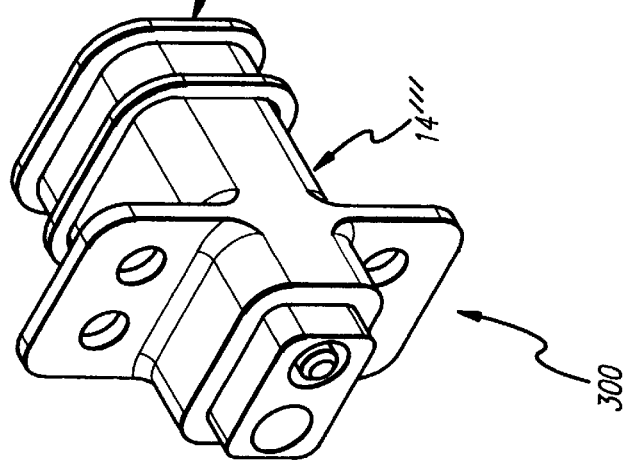
FIG. 9
FIG. 10

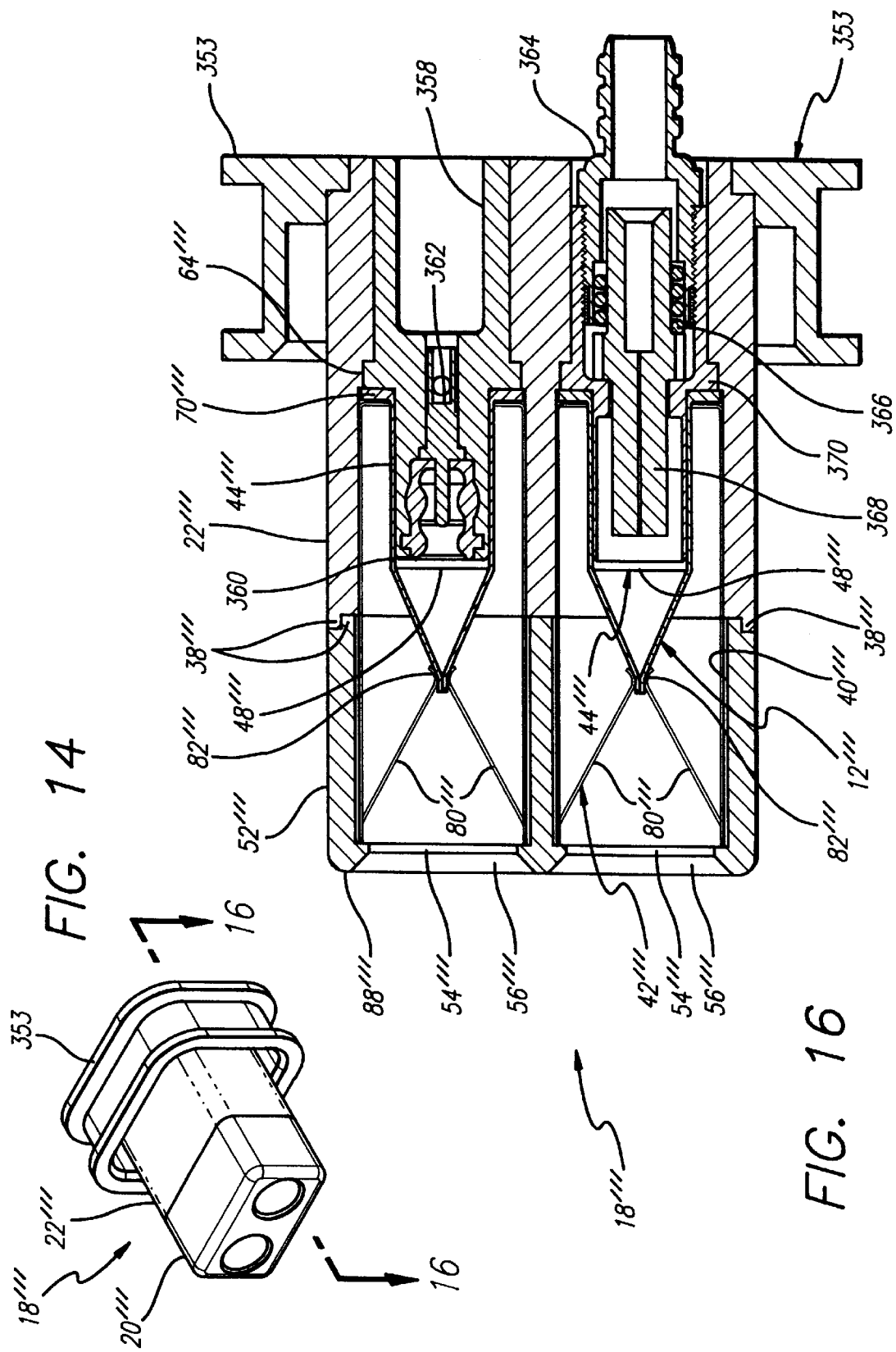

CONNECTOR ASSEMBLY WITH SELF ACTIVATING ENVIRONMENTAL SEAL

BACKGROUND OF THE INVENTION

This invention relates generally to a connector assembly for connecting the contact ends of two conductors, and, more particularly, to a connector assembly having an automatic seal enclosing at least one of the contacts to prevent its exposure to dirt, moisture and other contaminants.

Connector assemblies that join the ends of electrical and fiber optic conductors are well known. A connector assembly typically incorporates two matable housing portions, each of which holds one contact end of the conductor to be joined. Thus, the contacts are connected when the two housings are joined. In situations where a device, such as an avionics module for an aircraft, has numerous output contacts, one portion of a connector assembly can be permanently mounted about each output contact projecting from that device. Thus, when the avionics module is installed in the aircraft, the other portion of each connector assembly is mated to the corresponding connector portion on the device.

Any device, including the avionics module described above, can encounter contaminants such as dirt, dust and moisture while the device is in use or while it is in storage prior to use. Because the contacts on such devices can be highly susceptible to such contaminants, it is desirable to protect the contacts, by sealing them inside of their respective connector assembly housings. In this regard, it should be appreciated that very small contaminant amounts can disrupt a connection between the contact ends of two optical fibers. Thus, an important function of a housing of a connector assembly is to protect its associated contact(s) from contaminants during the time the device is in storage (i.e., when the connector assembly portions are not connected), as well as during the time the device is in use (i.e., when the connector assembly portions are mated together).

Some connector assemblies incorporate plugs or caps that snap on or thread over the mating ends of each of the unmated connector housings, to provide a seal protecting the contact therein from contaminants. While such plugs or caps are generally effective in preventing contamination when the housings of the connector assembly are not joined, they are somewhat labor intensive to install and remove, resulting in higher labor expenses and increased installation times. In addition, the plugs and caps can easily be lost, resulting in yet further inefficiency and the possibility that field personnel will neglect to replace lost plugs and caps, resulting in a failure to protect the contacts of a particular device.

Newer connector assemblies, incorporating elastomeric seals, have been developed to address the shortcomings described above. However, while these connector assemblies are generally effective in protecting contacts from contamination during the times when the connector portions are not interconnected, they also have certain drawbacks. In particular, one of these newer connector assemblies has a female connector housing having an elastomeric membrane with a small cut therein. The male housing is configured to deform the membrane to widen the cut and allow an optical fiber contact to pass therethrough when the male and female housings are joined. In the unconnected position, the small cut is not deformed and can protect the contact inside the female portion from contaminants.

Several disadvantages are associated with the above connector assembly. In particular, because the elastomeric memory of the membrane can fade, the small cut may over time fail to seal after the male housing is removed. Further, should a repair become necessary, the pieces of this connector assembly can be difficult to remove and replace. Another drawback also is associated with the memory of the elastomeric material, the characteristics of which can limit the size of the cut and thus the size of the connector assembly and the contact therein. Yet another drawback of this connector is that the seal provided by the closed cut lacks integrity because the cut in the elastomeric material is not preloaded or biased toward the closed (sealed) position. Because of this lack of preload to hold the small cut closed, changes in temperature and pressure can cause the cut to open, thereby degrading the seal and allowing contaminants to enter the female housing and foul the contact mounted therein.

Another connector assembly incorporates an elastomeric sleeve integrally molded into a female housing. The sleeve extends through a slit in a surrounding elastomeric grommet, which is, in turn, surrounded by a tensioned elastomeric constricting ring. The constricting ring squeezes the grommet and the sleeve into a flattened closed position to seal that portion of the connector assembly. While this connector assembly is generally effective, its component pieces are difficult to remove and replace. Further, because the sleeve is forced open by direct engagement with a male connector housing, the sleeve can be worn or damaged from such contact. Finally, because the circular constricting ring surrounds each contact, a connector assembly with many separate contacts would have a one seal assembly (i.e., a sleeve, a grommet and a constricting ring) mounted about each contact. This arrangement that has one seal assembly for each contact is complicated and thus expensive to manufacture and difficult to repair.

It should therefore be appreciated that there is a need for a connector assembly that has a seal assembly comprised of simple, reliable, easily replaceable, and inexpensive components. The present invention fulfills this need.

SUMMARY OF THE INVENTION

The present invention provides a connector assembly that has a seal assembly comprised of simple, reliable, easily replaceable, and inexpensive components. Significantly, the connector assembly has a female housing that automatically seals the contact therein when the connector assembly is not assembled. This seal advantageously prevents contamination of the contact within the female housing. Additional advantages are discussed below.

In particular, the connector assembly is for connecting the first and second contacts. The connector assembly includes a male housing, a female housing, a resilient sleeve and a spring. The male housing has a rigid projection and an interior surface that defines a longitudinal passageway sized to mount the end of a first contact therein. Like the male housing, the female housing has an interior surface defining a longitudinal passageway sized to mount the end of a second contact therein.

The resilient sleeve has an interior surface that defines a longitudinal passageway between a first opening and a second opening. The sleeve is elastically deformable from a resting position wherein the passageway therein is open and a collapsed position wherein the passageway is closed. The open passageway of the sleeve is sized to accept the first contact therein to facilitate the connection. The sleeve is mounted adjacent to the passageway of the female housing to allow the first contact to pass into the passageway of the sleeve and connect with the second contact when the male and female housings are connected.

The spring is mounted adjacent to the interior surface defining the passageway of the female housing and is located to engage the sleeve and bias it to its collapsed position. The spring also is located to interferingly engage the rigid projection of the male housing so that, upon the connection of the male and female housings, the projection forces the spring to release its engagement with the sleeve, whereupon the sleeve deforms to its resting position to accept the first contact therein.

More detailed aspects of the invention independently provide that the sleeve has a cylindrical shape, that the spring is sized to fit within two mating portions of the female housing, that the spring is a leaf spring or that the sleeve can have an oval shape to simultaneously enclose more than one contact. In this regard, it should be appreciated that the connector assembly of the present invention can be used with any conductors, including electrical conductors and optical fiber conductors.

The features described above are related to several significant advantages. In particular, because the projection on the male housing contacts the spring to release the sleeve to allow the insertion of the first connector end, the sleeve resiliently resumes its open resting position. Unlike other connector assemblies, the sleeve is not forced apart by contact with any object and thus the sleeve of the invention does not sustain wear from such contact and is less likely to be damaged. Another advantage is related to the spring and the other sealing components, which can be sized to be simply placed inside two cooperating portions of the female housing to enable easy repair and replacement and inexpensive manufacture of the connector assembly.

Yet another advantage is related to the simple yet revolutionary nature of the sleeve, which can have an oval shape, thereby allowing only one sleeve to enclose numerous contacts. Because only one sleeve is needed, the connector is advantageously less expensive and more convenient to repair and replace. A further advantage is related to the spring, which can be of any size, thereby not restricting the size of the connector assembly, unlike some conventional connectors, which are of limited size because they rely upon the limited elastic memory of a membrane to provide a seal. Yet another advantage also is related to the spring, which is not effected by the elastic memory fading problem associated with elastomeric membranes that rely upon their elastic memory to form a seal in a resting position. Thus, the spring of the present invention will consistently close the sleeve to provide a reliable seal.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings:

FIG. 4 is a cross sectional view of the connector assembly of FIG. 2, in an unconnected position;

FIG. 5 is a cross sectional view of the connector assembly of FIG. 2, in a partially-connected position;

FIG. 9 is a perspective view of a third alternative embodiment of the connector assembly of the invention;

FIG. 10 is a cross sectional view of the connector assembly of FIG. 9;

FIG. 14 is a perspective view of a female housing of the connector assembly of FIG. 9;

FIG. 16 is a cross sectional view of the female housing of FIG. 14, taken about lines 16—16;

DESCRIPTION OF THE PREFERRED EMBODIMENTS

With reference now to the drawings, and particularly to FIGS. 1, 2, 7, 8 and 9, the present invention is a connector assembly incorporating one or more resilient sleeves that automatically seal upon the uncoupling of the connector assembly. When the connector assembly is in an unmated condition, the resilient sleeve is automatically closed, thereby inexpensively and reliably preventing contaminants from fouling a contact located within the sleeve. The sleeve resiliently and automatically opens when the connector assembly is assembled.

Figure 1:
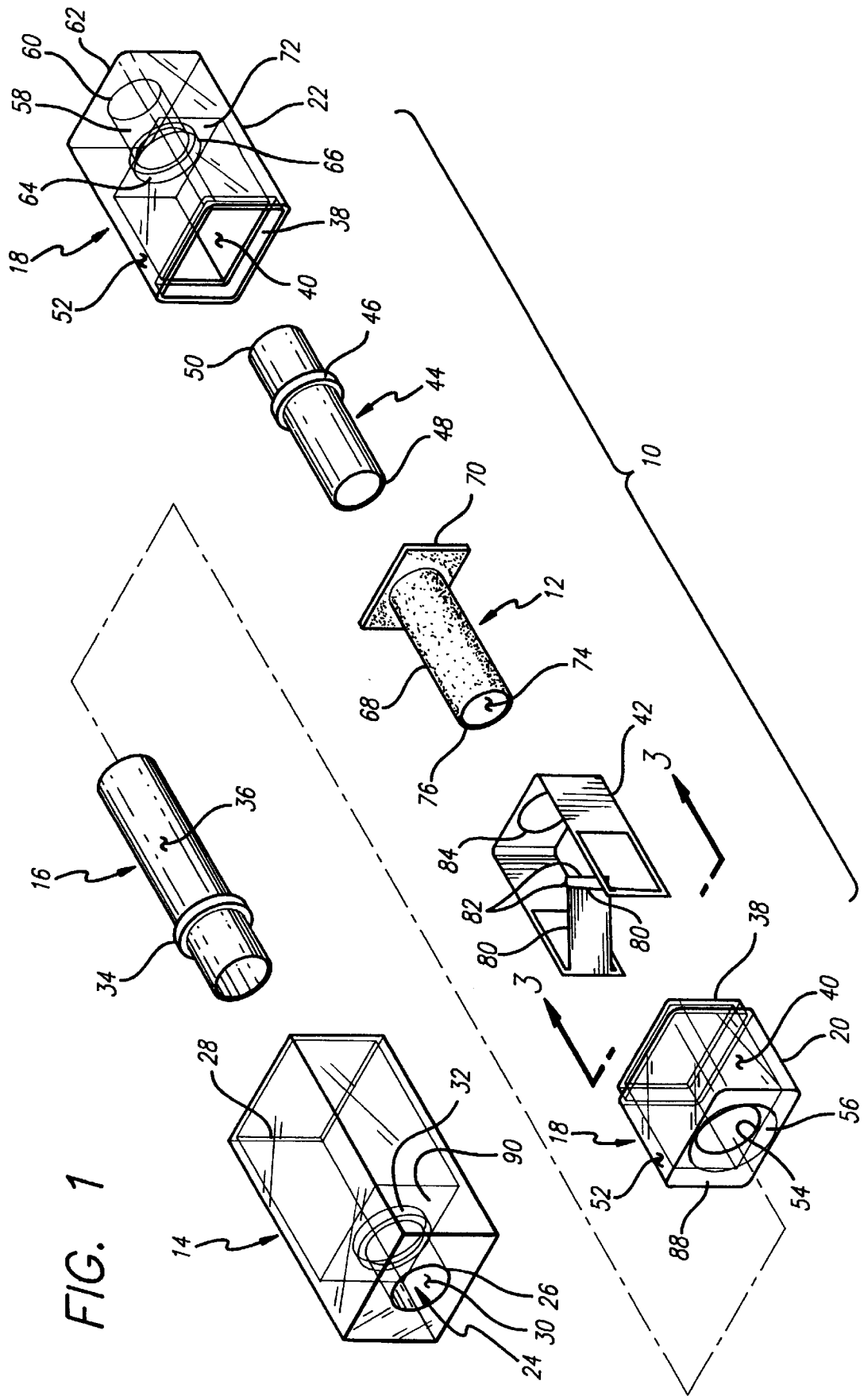
FIG. 1 is an exploded perspective view of a connector assembly of the invention.
Figure 2:
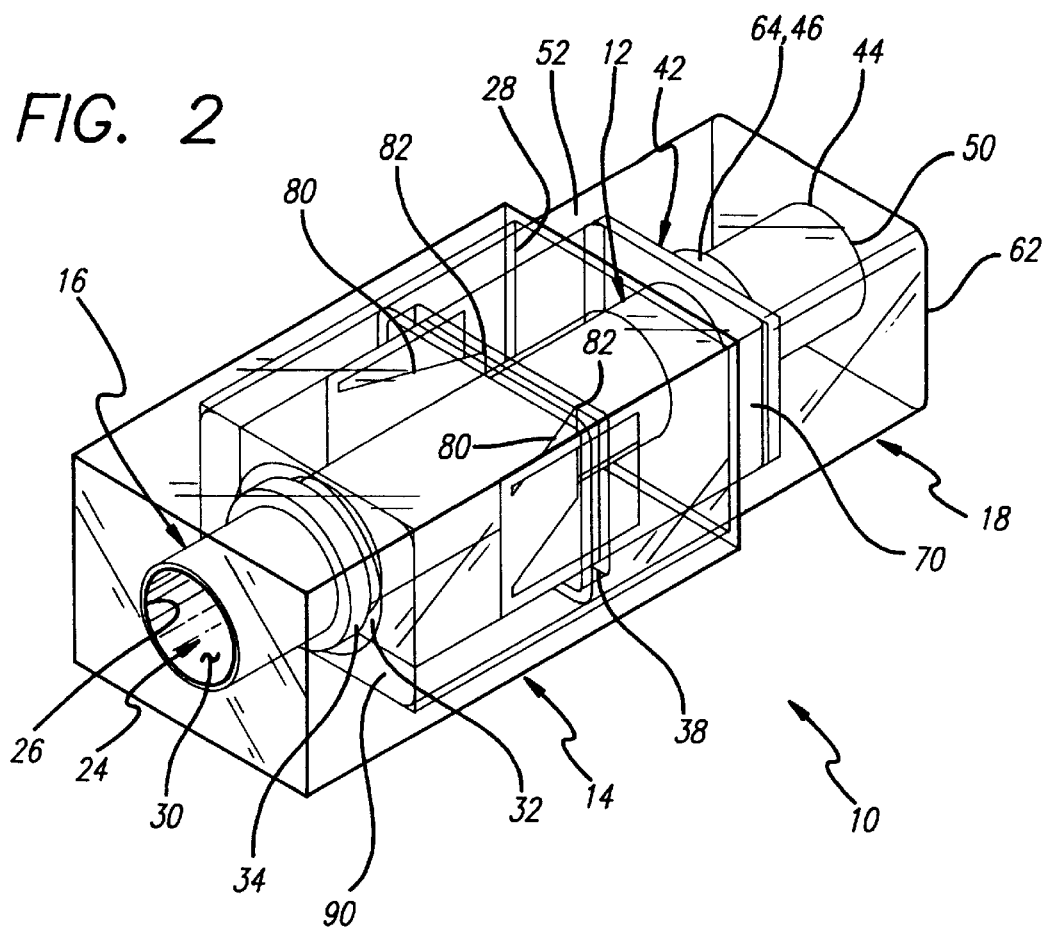
FIG. 2 is a perspective view of the assembled connector assembly of FIG. 1.
Figure 6:
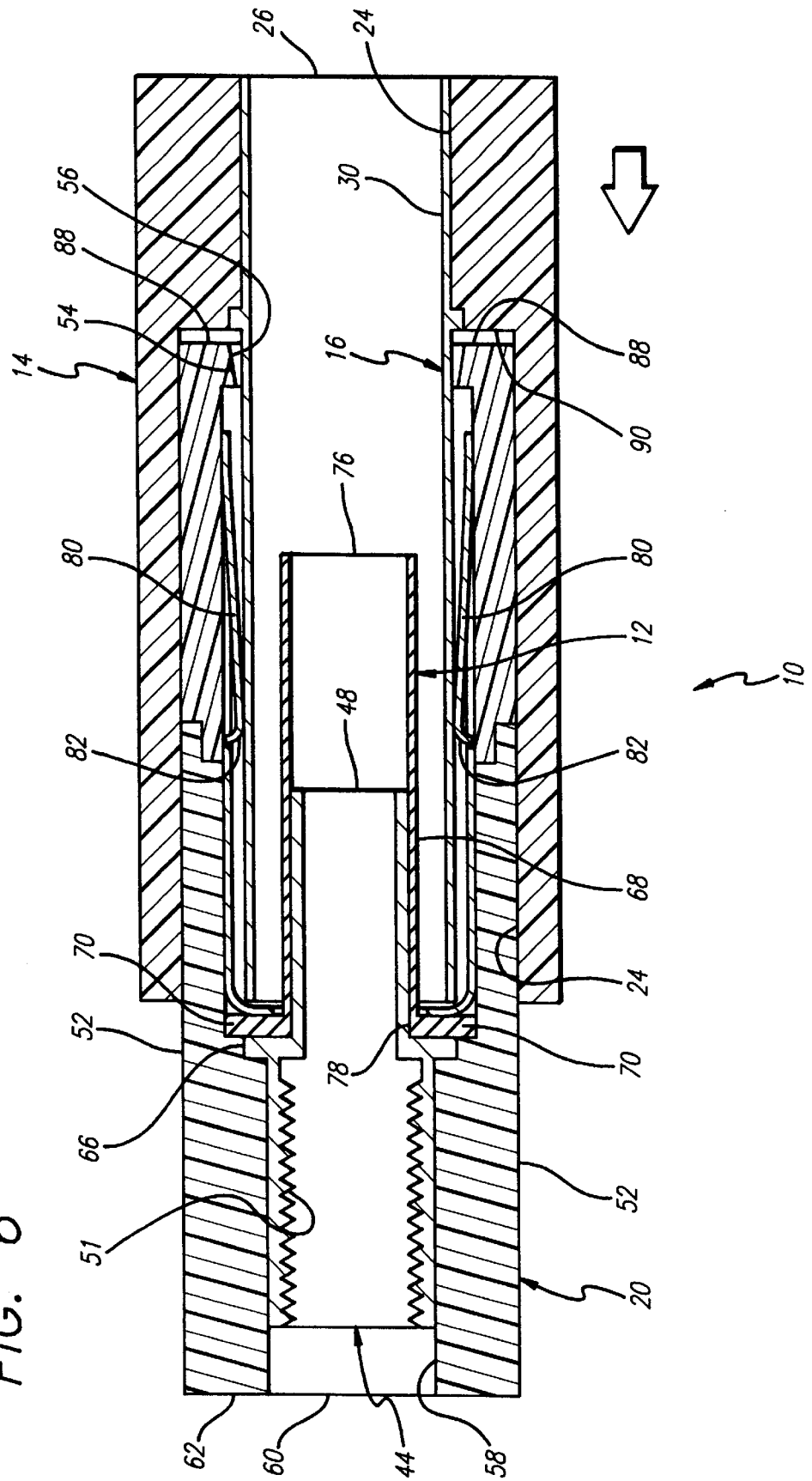
FIG. 6 is a cross sectional view of the connector assembly of FIG. 2, in a connected position.

With reference to FIGS. 1, 2 and 6, a first connector assembly, generally referred to by the reference numeral 10, is shown to include a special resilient sleeve 12 that has a cylindrical shape in its resting position. This connector assembly also includes a transparent male housing 14 having a rigid tubular projection 16 and a transparent female housing 18 comprised of a forward portion 20 and a rear portion 22. Because the housings 14 and 18 are transparent, a worker can readily determine whether the connector assembly is working properly. The male housing has an interior surface 24 that defines a longitudinal passageway through the length of the housing between a circular rear opening 26 and a rectangular forward opening 28. The interior surface has a cylindrical portion 30 from the rear opening to a location inside the male housing where a circular notch 32 is located. The projection 16 has a diameter sized to snugly fit within the cylindrical portion 30 of the male housing's interior surface 24. A circumferential rib 34 is located on the external surface 36 of the tubular projection 16. The diameter of the rib is sized to fit into the circular notch 32 inside of the male housing 14 to prevent the projection from moving rearwardly. The inside diameter of the tubular projection 16 is sized to accept one or more contacts (not shown), which can be of any type, including electrical or fiber optic contacts. The projection 16 can be fastened to the male housing 14 by a friction fit or by adhesive or other suitable fastener. The contact can be mounted in any conventional manner, including by threaded engagement, adhesives or by other suitable fasteners. One of the functions of the preferred tubular projection 16 is to protect the contact mounted therein from damage during the handling of the connector assembly 10.

The forward and rearward portions 20 and 22 of the female housing each have opposing rectangular projections 38 that snugly nest together to join these portions. The forward and rearward portions can be held together by a snap fit, by a simple friction fit, by adhesive or by any other suitable fastener. Both the forward and rearward female housing portions have a rectangular interior surface 40 to cooperatively enclose a leaf spring 42, the resilient sleeve 12, and a support tube 44 with an external circumferential rib 46 between a forward end 48 and a rearward end 50. The inside of the support tube 44 has threads 51 to accept the end of a second contact or multiple contacts (not shown), as required for a particular application. The forward and rearward female housing portions cooperatively define rectangular external surfaces 52 sized to slide into the forward opening 28 of the male housing portion 14. The forward portion 20 of the female housing 18 has a forwardly-facing circular opening 54 with a beveled leading edge 56 to guide the projection 16 on the male housing 14 into the opening 54 of the female housing 18.

The rearward portion 22 of the female housing 18 has a cylindrical interior surface 58 that, together with the interior rectangular surface 40, cooperatively defines a longitudinal passageway through that portion of the housing. The cylindrical interior surface 58 ends in a circular opening 60 on the rear end 62 of the female housing 18. The cylindrical interior surface also has a circular notch 64 located at its forward end 66 to receive the circumferential rib 46 on the support tube 44 to position the rearward end 50 of the support tube 44 inside the cylindrical interior surface 58 of the rearward housing portion 22. The support tube 44 can be fastened to the rearward female housing portion 22 by a friction fit or by adhesive or other suitable fasteners. The female and male housings 14 and 18 can be made of clear or opaque plastic or any other material of suitable strength and durability. The housings can be made by commonly known injection molding processes.

The resilient sleeve 12 has a tubular portion 68 and a rectangular base 70 that abuts an internal vertical transition surface 72 between the cylindrical portion 58 and rectangular portion 40 inside of the rearward portion 22 of the female housing 18. The base and the tubular portion can be press fit around the support tube 44 so that the sleeve 12 extends beyond the forward end 48 of the support tube 44. The sleeve 12 also has an interior surface 74 that defines a longitudinal passageway between a forward opening 76 and a rearward opening 78. The diameter of the passageway is sized to be slightly smaller than that of the support tube 44 to form a tight and snug seal about the support tube. The passageway also is sized so that the contact in the male housing 14 fits through the forward opening 76. The external diameter of the tubular portion 68 of the sleeve 12 is sized to fit inside of the tubular projection 16 of the male housing 14. Sleeve 12 can be made of any material that has a high elastic memory so that the sleeve 12 will expand into an open position when the leaf spring 42 is disengaged from the end of the sleeve 12, as is described below. The sleeve 12 can be made by commonly known injection molding processes with a material composed of the following ingredients: Silastic 35U Base (100 pphr), HT-1 heat additive (1 pphr), purple pigment (0.5 pphr), and Varox DBPH-5 catalyst (0.8 pphr).

Figure 3:
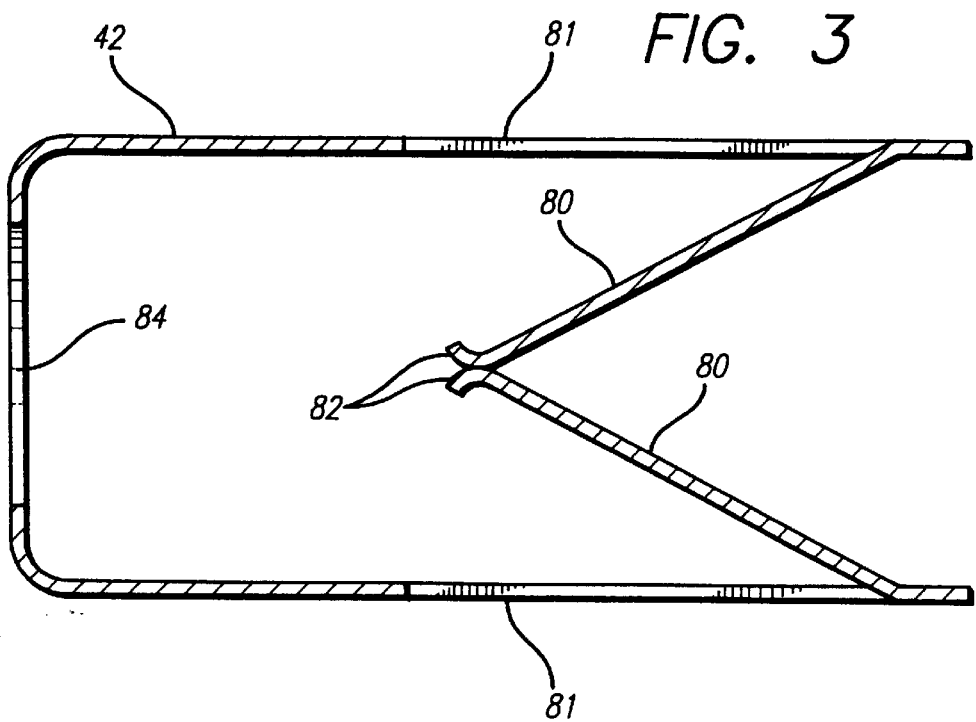
FIG. 3 is a cross-sectional view of a spring from the connector assembly of FIG. 1 taken about lines 3—3.

Lastly, as shown in FIGS. 3 and 4, the leaf spring 42 fits inside the rectangular surfaces 40 of the forward and rearward portions 20 and 22 of the female housing 18. The leaf spring 42 has two leaves 80 that, in a resting position, have opposing curved ends 82 pressing against each other. A hole 84 in the spring 42 allows the spring 42 to be inserted concentrically around the sleeve 12 to position the flexible forward opening 76 of the sleeve 12 in a location so that the ends 82 of the spring leaves 80 will engage and collapse the opening 76 of the sleeve 12, as shown in FIG. 4. This preferred leaf spring 42 is made out of BeCu material that is formed into shape and heat treated for 2 hours at 600° F. to achieve a spring temper. As shown in FIG. 3, the spring has, when viewed in cross-section divergent arms 81 that define a "V" shape. These diverging arms are compressed when the spring is installed into the rectangular-walled female housing so that the leaf ends 182 compress sleeve 12 with force sufficient to achieve a seal.

Now with respect to FIGS. 4–6, the operation of the first connector assembly embodiment 10 will now be described. First, as shown in FIG. 4, the male and female housings 14 and 18 are placed in an opposed aligned relationship wherein the forward openings 28 and 54 of the housings are facing each other. In this unconnected position, the tubular sleeve 12 is collapsed and sealed by the spring 42, thereby advantageously preventing contamination from entering inside of the sleeve 12 and the support tube 44, where one of the contacts would be mounted.

Next, as shown in FIG. 5, the male and female housings 14 and 18 are moved toward each other so that the external surface 52 of the female housing 18 fits within the forward opening 28 of the male housing 14. In this intermediate position, the tubular projection 16 of the male housing 14 contacts the leaves 80 of the spring 42 at a contact area 86 and forces the leaves 80 apart to release the resilient sleeve 12, which begins to resiliently expand to its resting open position. When the housings 14 and 18 are fully mated, the forward end 88 of the female housing can optionally abut a vertical stop surface 90 inside the male housing 14. When the sleeve 12 has opened, a longitudinal passageway is provided through the connector assembly for the contacts to connect. The unconnecting process is the reverse of that described above, resulting in the resealing of one of the contacts inside of the female housing 18.

The above arrangement results in several important advantages. One significant advantage is that, unlike other connector assemblies, the sleeve 12 is not forced apart by contact with any object and thus the sleeve 12 does not sustain wear from such contact and is less likely to be damaged. Another advantage is related to the multi-part female housing 18, which can be taken apart to enable easy repair and replacement of the sleeve 12 and spring 42 and also to facilitate inexpensive manufacture of the connector assembly 10.

Yet a further advantage is related to the spring 42, which can be of any size, thereby not restricting the size of the connector assembly 10, unlike some conventional connectors, which are of limited size because they rely upon the limited elastic memory of a membrane to provide a seal. Another advantage also is related to the spring 42, which is much less likely to be affected by the elastic memory fading problem associated with elastomeric membranes that rely solely upon their elastic memory to form a seal in a resting position. Thus, the spring 42 of the present invention will consistently and reliably close the sleeve 12.

Figure 7:
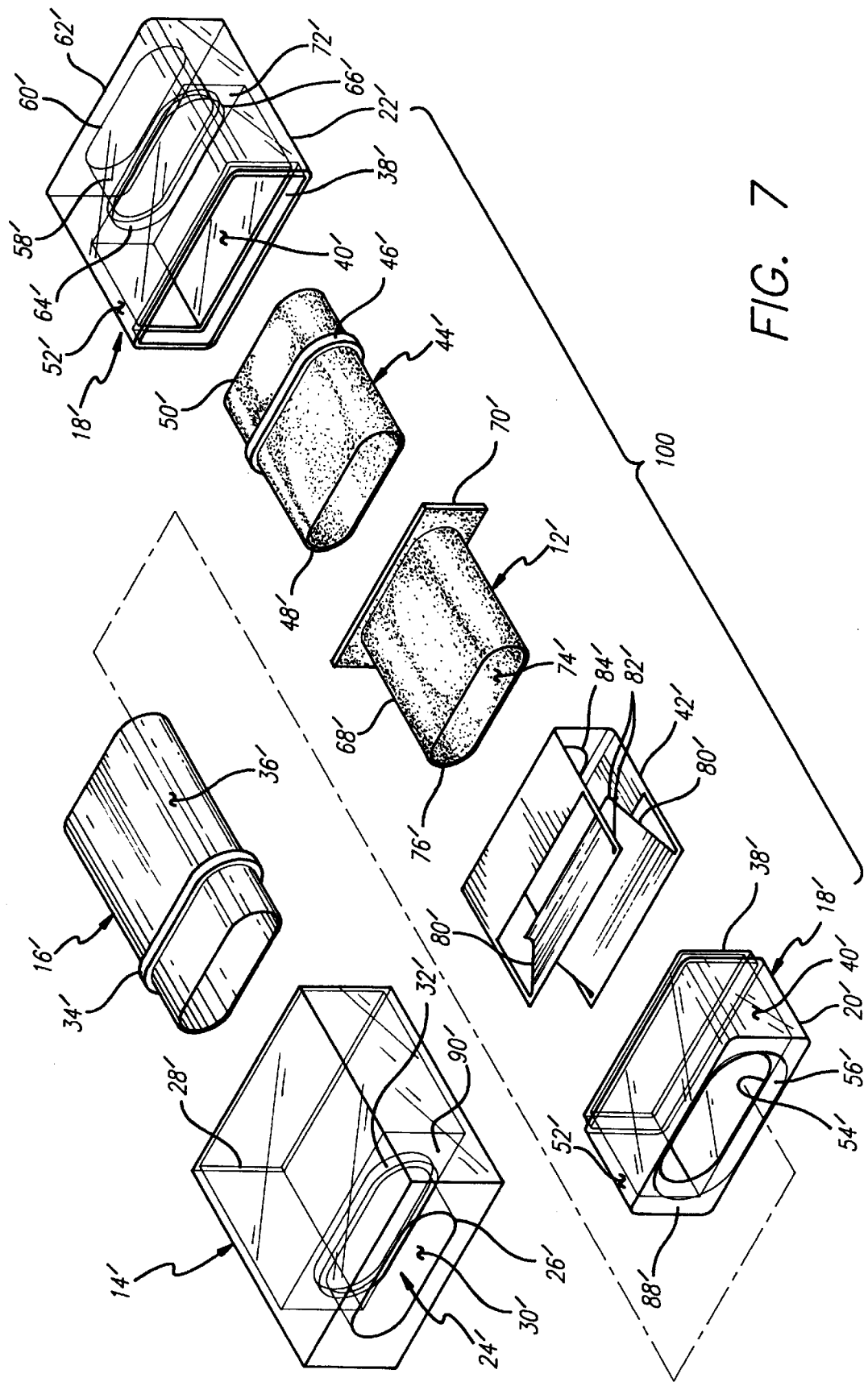
FIG. 7 is an exploded perspective view of a first alternative embodiment of the connector assembly of the invention.

Another embodiment of a connector assembly 100 is shown in FIG. 7. The reference numerals for this embodiment are the same as the numerals for the first embodiment 10, except for a "'" to annotate that they refer to the second embodiment 100. This connector assembly 100 has a resilient sleeve 12' with an oval shape to seal multiple contacts in the female housing 18'. An oval support tube 44' is located within the oval sleeve 12'. The male housing 14' has a corresponding oval tubular projection 16' to enclose multiple contacts and to engage a spring 42' to release the sleeve 12'. The spring 42' is similar to that of the first embodiment, except the leaves 80' are wider to ensure that the oval sleeve 12' is fully compressed to provide an adequate seal. Also like the first embodiment, the female housing 18' has forward and rearward portions 20' and 22' to enclose the components mounted therein and provide for easy repair and replacement and inexpensive manufacture of the connector assembly 100. The fit and function of the details pointed out by the remaining reference numerals are the same as those previously described, except for where an oval shape has been used to accommodate the oval sleeve 12' and the other oval-shaped components.

This embodiment 100 illustrates yet another advantage related to the simple yet revolutionary nature of the sleeve 12' and spring 42' arrangement, which can accommodate an oval shape, thereby allowing only one sleeve 12' to enclose numerous contacts. Because only one sleeve 12' is needed, the connector assembly 100 is advantageously less expensive to make and more convenient to repair, as compared to conventional connectors, which can have a complex sealing mechanism for each contact. This embodiment 100 also provides the advantages described above for the first embodiment 10.

Figure 8:
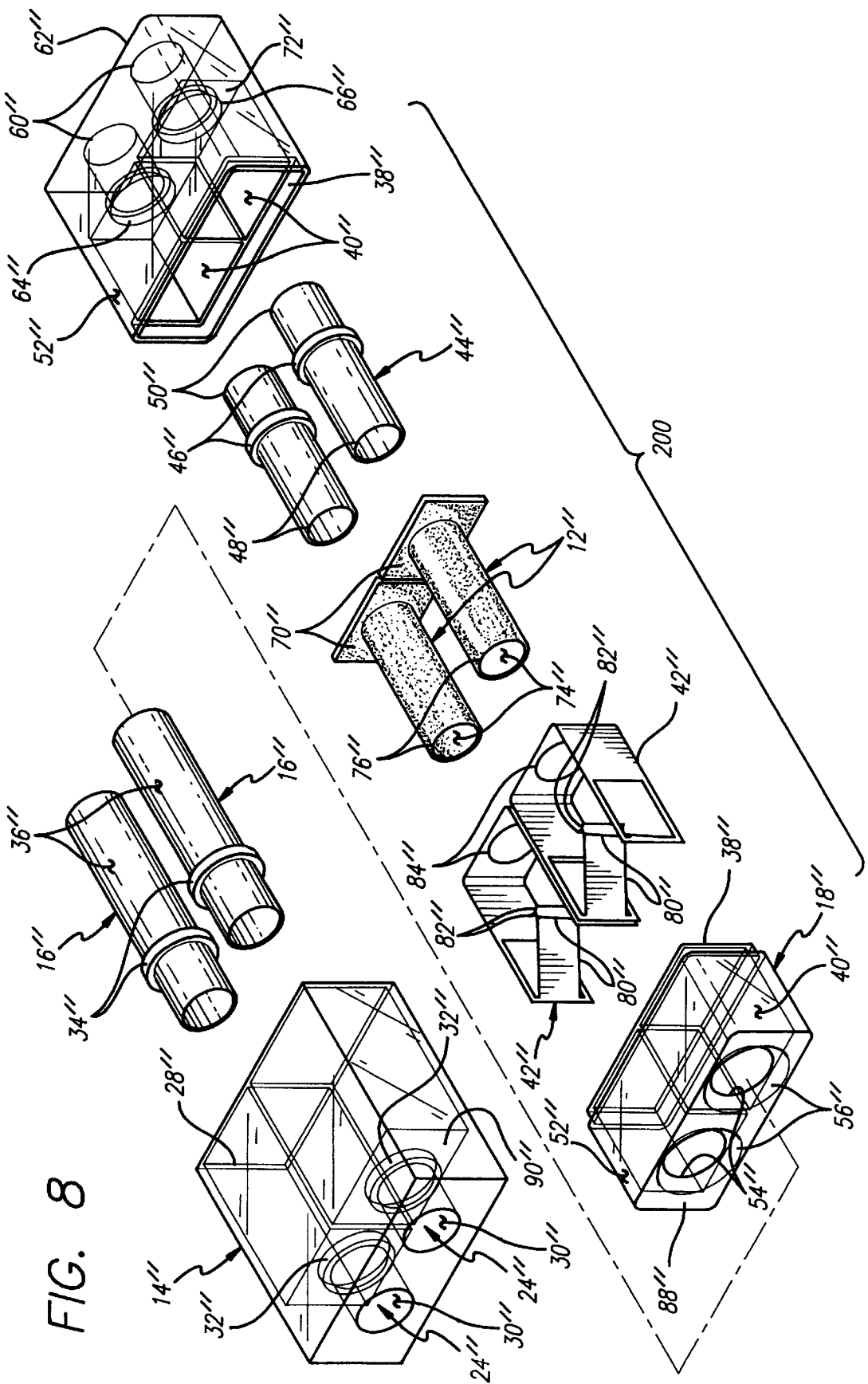
FIG. 8 is an exploded perspective view of a second alternative embodiment of the connector assembly of the invention.

Another connector assembly embodiment 200 is shown in FIG. 8. The reference numerals for this embodiment 200 are the same as the numerals for the first embodiment 10, except for a "''" to annotate that they refer to the third embodiment 200. This connector assembly 200 has a male housing 14" and a female housing 18" and interior components similar to those of the first connector assembly 10 described above and is essentially two of these assemblies 10 joined together in a side by side orientation. The male housing 14" is configured to accept two contacts and two tubular projections 16". Similarly, the female housing 18" has forward and rearward portions 20" and 22" that enclose two leaf springs 42", two sleeves 12", and two support tubes 44", each having inside diameters sized to each enclose associated contacts. The fit and function of the details pointed out by the reference numerals of this embodiment 200 are the same as those previously described for the first embodiment 10, except for where the structure has been altered to provide the aforementioned side by side arrangement. While having the advantages discussed above, the side-by-side configuration of this connector assembly 200 can be adjusted for particular applications to reduce the size of a particular connector.

Another connector assembly embodiment 300 is shown in FIGS. 9–19. This connector assembly is generally similar to the third connector assembly embodiment 200 described above, with the addition of fiber optic contact assemblies 302 and 356 and electrical contact assemblies 306 and 354.

The connector assembly has a male housing 14''' and a female housing 18''', which are shown in the mated position in FIGS. 9 and 10.

Figure 11:
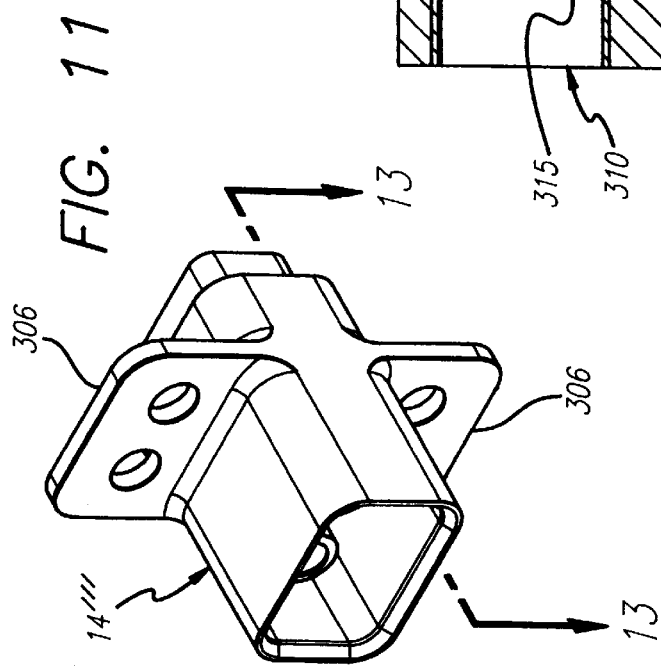
FIG. 11 is a perspective view of a male housing of the connector assembly of FIG. 9.
Figure 13:
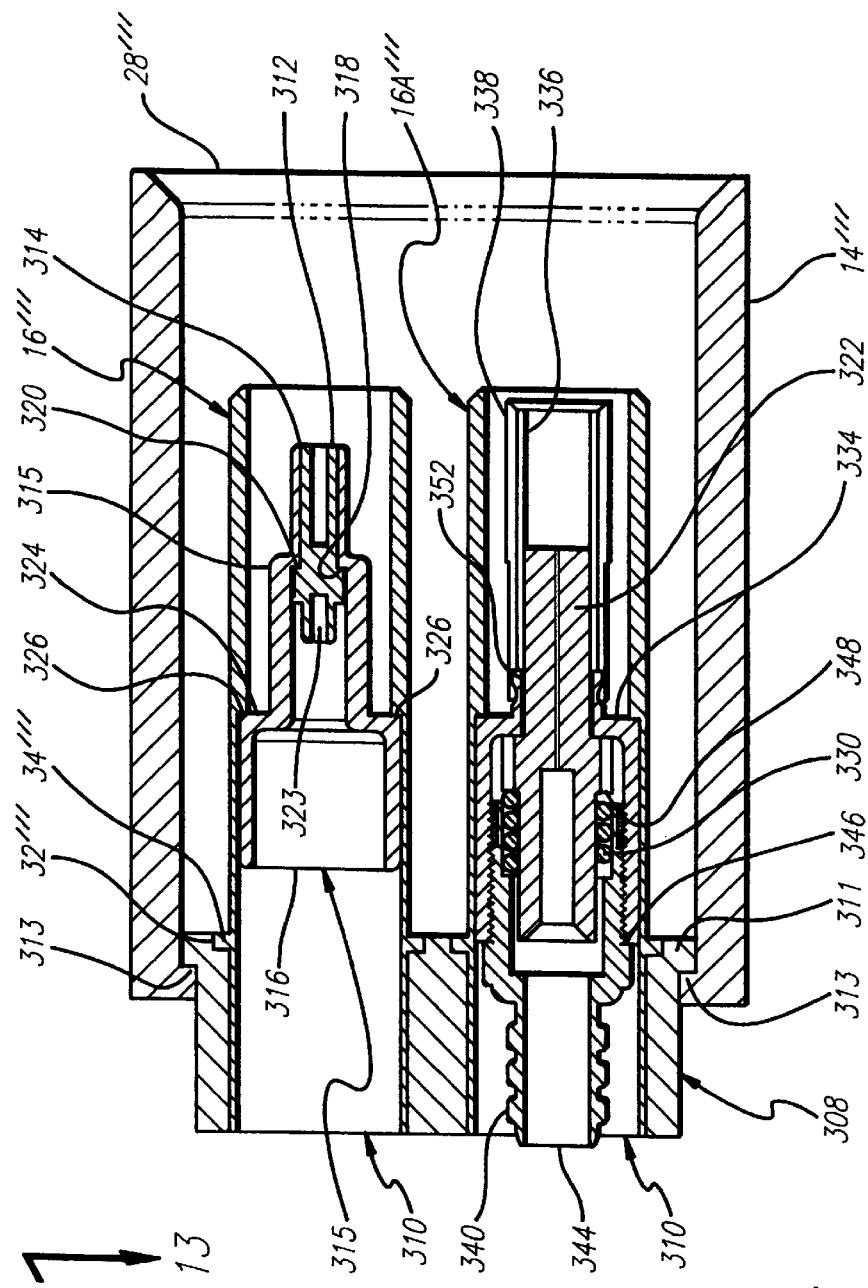
FIG. 13 is a cross sectional view of the male housing of FIG. 11, taken about lines 13—13.
Figure 12:
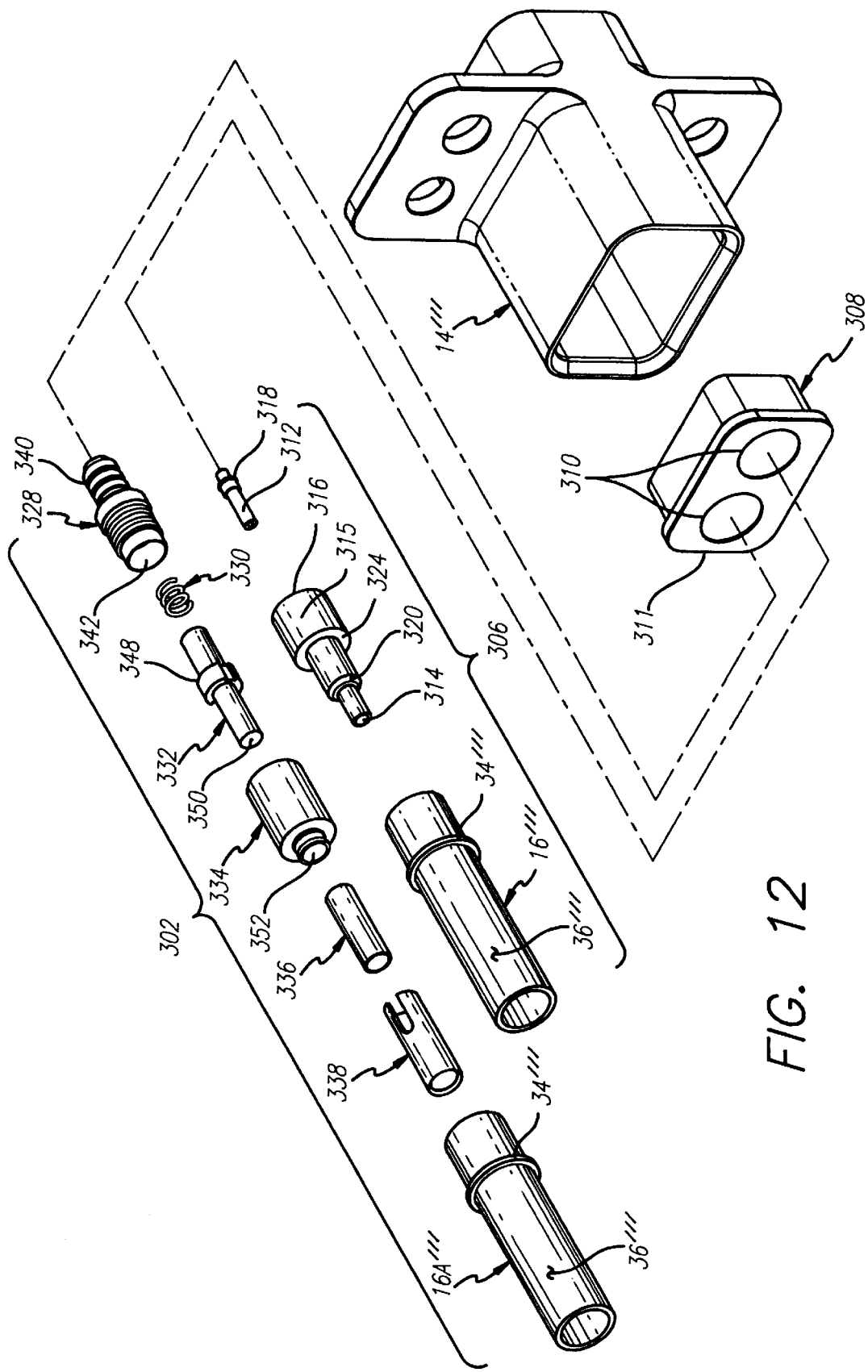
FIG. 12 is an exploded perspective view of the male housing of FIG. 11.

With reference to FIGS. 11–13, the male housing 14''' has opposing external flanges 306 for easy handling. Like the previous embodiments, the reference numerals with ". . . '''" denote structure that has a fit and function similar to that already described with respect to the first embodiment 10. The male housing 14''' of this connector assembly 300 encloses an insulator 308 with two holes 310 having diameters to accept one of the electrical contact assemblies 306 and one of the fiber optic contact assemblies 302 therein. The insulator has a circumferential flange 311 sized to fit inside of the housing 14''', which has corresponding stop flange 313 on its rearward end. Thus, the insulator 308 can be easily installed and removed from the housing 14'''.

The electrical contact assembly 306 includes a tubular housing 16''', a small tubular insulator 315, and a smaller tubular socket contact 312. The insulator 315 has a forward opening 314 and a rearward opening 316 with an internal passage therebetween. The socket 312 is concentrically mounted inside the passage of the insulator 315, which has a diameter sized to accept the contact therein. The socket contact 312 has a shoulder 318 that abuts a similar shoulder 320 inside the insulator so that a forward end of the socket 322 is exposed in the forward opening of the insulator to facilitate connection with the other electrical contact assembly 308. The rearward end of the socket also includes a depression 323 for connecting an electrical conductor, as is well known in the art. The insulator can be made of ULTEM 1000®, sold by the General Electric Company, or any other material with suitable insulating properties, including dieelectric plastics. The socket can be made of BeCu metal with layers of gold and nickel plating. The housing 16''' has a circular internal shoulder 324 that abuts a corresponding circular shoulder 326 on the insulator 3 10.

Another housing 16A''' in the male housing assembly 14''' encloses the first fiber optic contact assembly 302. The fiber optic contact assembly 302 includes a tubular fiber optic backshell 328, a spring 330, a tubular fiber optic ferrule 332, a tubular fiber optic inner housing 334, a tubular fiber optic alignment sleeve 336 and a tubular alignment sleeve housing 338. The backshell has a rearward end 340 configured to mount to an optical fiber and has an internal passage between a forward opening 342 and rear opening 344. The internal passage has a shoulder 346 sized to retain the spring 330 therein between the shoulder 346 and a cooperating shoulder 348 on the ferrule 322, which nests inside the forward end of the backshell 328. The fiber optic housing 334 fits concentrically over a forward end 350 of the ferrule and threads onto the backshell 328. The housing 334 has a forward end 352 that the alignment sleeve 336 is concentrically mounted around to align the fiber optic contact. The alignment sleeve housing 338 is mounted concentrically around the alignment sleeve 336. These components contain an optical fiber and allow the fiber optic contact assembly to be taken apart and reassembled for repair purposes.

Figure 15:
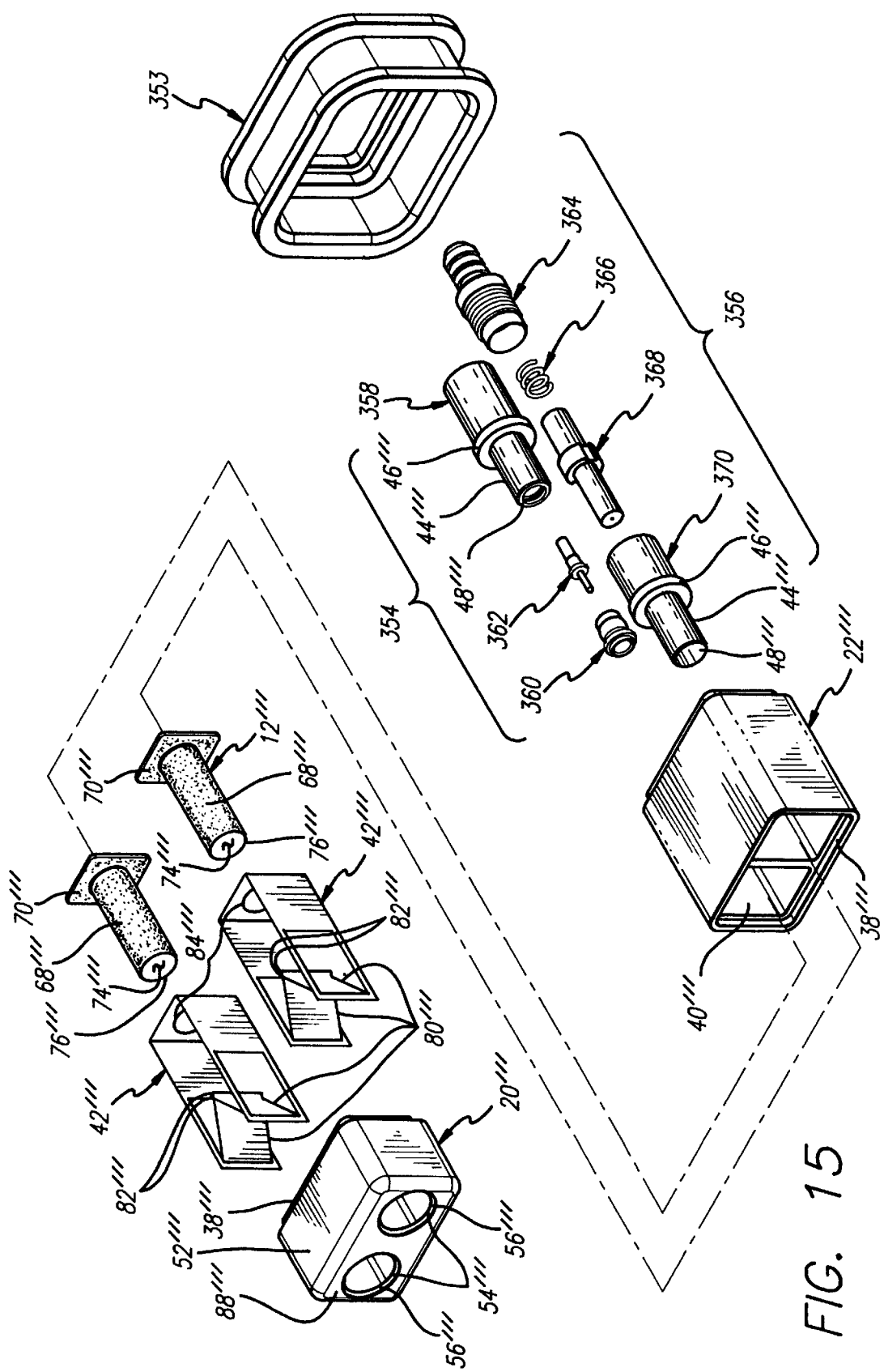
FIG. 15 is an exploded perspective view of the female housing of FIG. 14.

With reference to FIGS. 14–16, the female housing assembly 18''' has a forward portion 20''' removably mounted to a rearward portion 22''' that mounts to a rear flange portion 353. The female housing assembly encloses an electrical contact assembly 354 and a fiber optic contact assembly 356.

The electrical contact assembly 354 includes an insulator 358, an interfacial seal 360, and a pin contact 362. The fiber optic end assembly 356 includes a backshell 364, a spring 366, a ferrule 368, and a housing 370. Both the insulator 358 and the housing 370 have forward portions 44''' that function like the support tube 44 of the first embodiment 10. Both the insulator 358 and the housing 370 also have external circumferential ribs 46''' that nestedly mount into circular slots 64''' formed inside of the rearward female housing 22''' where they are held by suitable adhesive. The pin contact 362 can be made of BeCu metal and can be bonded to the insulator 358 and the interfacial seal 1360. The seal should be able to handle the voltage of a particular application can be changed as needed. The remainder of the structural details of the female housing 18''' are similar to those described above sharing the same basic reference numeral.

Figure 17:
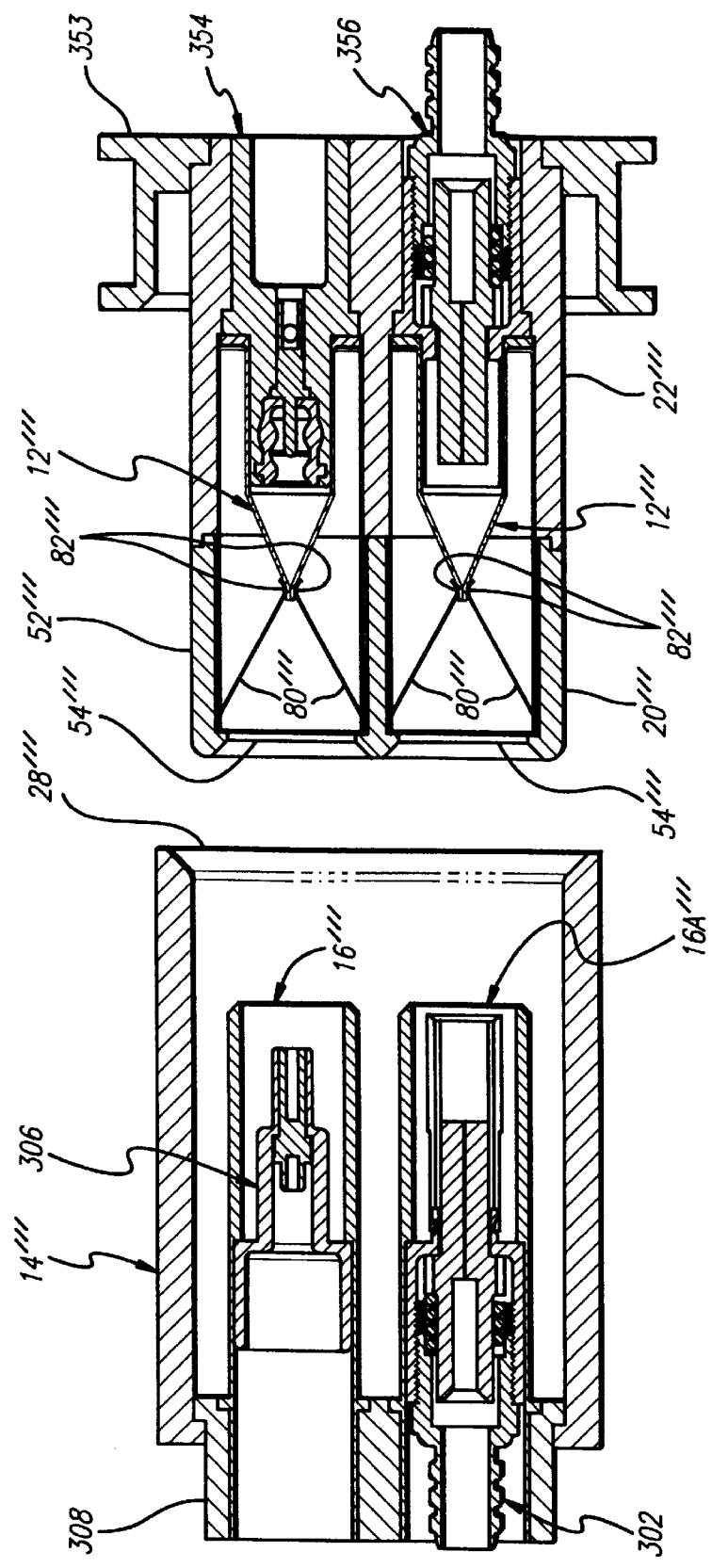
FIG. 17 is a cross sectional view of the female and male housings of the connector assembly of FIG. 9, shown in an unmated position.
Figure 18:
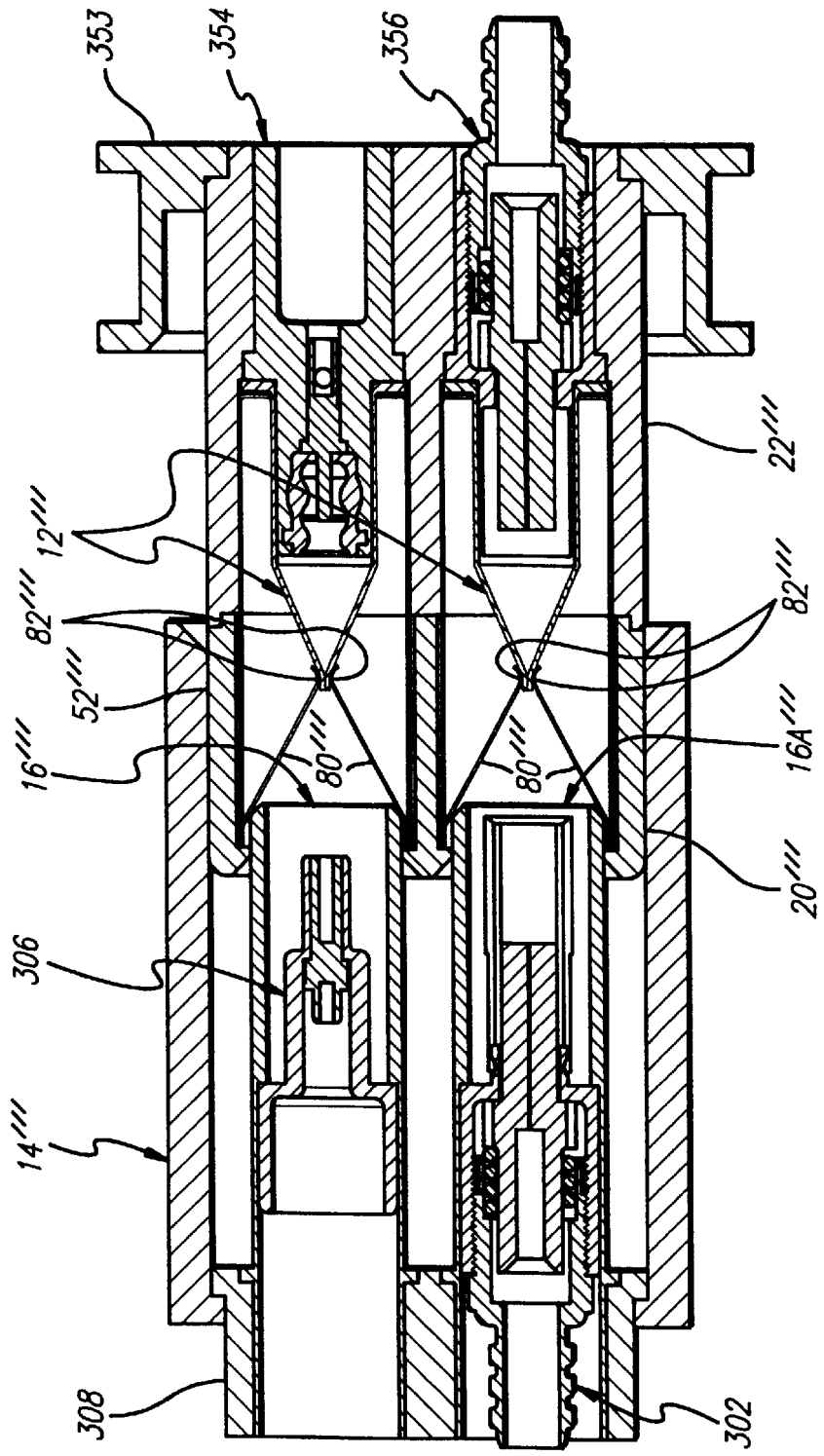
FIG. 18 is a cross sectional view of the female and male housings of the connector assembly of FIG. 9, shown in a start of mating position.
Figure 19:
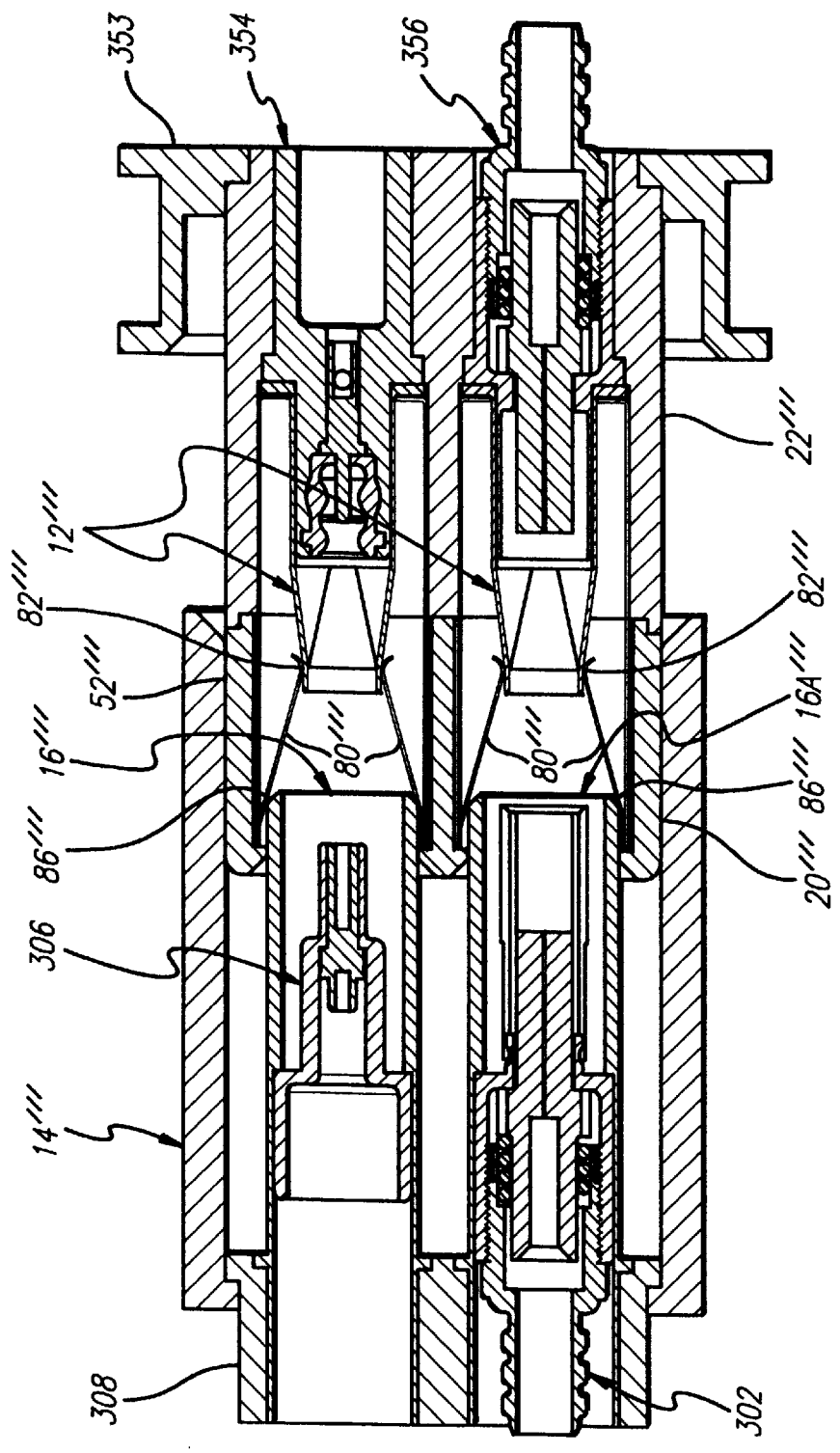
FIG. 19 is a cross sectional view of the female and male housings of the connector assembly of FIG. 9, shown in an intermediate mated position.

FIGS. 17, 18, 19 and 10 illustrate the process of assembling the connector assembly 300. FIG. 17 illustrates the unmated position and FIG. 18 illustrates the start of the mating process. FIG. 19 illustrates an intermediate mating position wherein the leaves 80''' of the spring 42''' are starting to release the resilient sleeve 12'''. FIG. 10 illustrates the completely mated position, in which 0.030 inch can separate the ends of the fiber optic end assemblies 302 and 356. In the mated position, the socket 312 is concentrically mounted about the pin contact 362 to establish an electrical connection. The connector assembly 300 described above has the same advantages discussed above for the other embodiments.

While a particular form of the invention has been illustrated and described, it will be apparent that various modifications can be made without departing from the spirit and scope of the invention. Accordingly, it is not intended that the invention be limited, except as by the appended claims.

We claim:

1. A connector assembly for connecting a first and a second contact, comprising:
    a male housing having a rigid projection and an interior surface defining a longitudinal passageway sized to mount the first contact therein;
    a female housing having an interior surface defining longitudinal passageway sized to mount the second contact therein;
    a resilient sleeve having an interior surface defining longitudinal passageway between a first opening and a second opening, the resilient sleeve being elastically deformable from a resting position wherein the passageway is open and a collapsed position wherein the passageway is closed, the passageway of the sleeve in the resting position sized to accept the first contact therein, the sleeve mounted adjacent to the interior surface defining the passageway of the female housing to allow the first contact to pass into the sleeve and connect with the second contact upon the connection of the male and female housings; and
    a spring mounted adjacent to the passageway of the female housing, the spring located to engage the sleeve and bias the sleeve toward the collapsed position, the spring also located to interferingly engage the rigid projection of the male housing such that upon the connection of the male and female housings the projection forces the spring to release from engagement with the sleeve, whereupon the sleeve deforms to the resting position to accept the first contact therein.

2. The connector of claim 1, wherein the interior surfaces of the male and female housings define longitudinal passageways sized and configured to mount electrical contacts therein.

3. The connector assembly of claim 1, wherein the interior surfaces of the male and female housings define longitudinal passageways sized and configured to mount fiber optic contacts therein.

4. The connector assembly of claim 1, wherein the spring includes two leaves having opposing ends for compressing the sleeve therebetween.

5. The connector assembly of claim 1, wherein the female housing includes two portions configured to engage each other and releasably hold the spring within the female housing.

6. The connector assembly of claim 5, wherein the spring further comprises opposing, diverging arms spaced apart so as to be compressed upon the assembly of the female housing to hold the spring.

7. The connector assembly of claim 1, wherein the resilient sleeve is cylindrical.

8. The connector assembly of claim 1, wherein the spring closes passageway of the sleeve at a location adjacent to the opening of the sleeve that accepts the first contact therein.

9. The connector assembly of claim 1, wherein the female housing further includes an internal support surface extending partially along the length of the longitudinal passageway of the sleeve, to prevent the deformation of that portion of the sleeve.

10. The connector assembly of claim 1, wherein:
    the sleeve has an oval configuration; and
    the interior surfaces of the male and female housings are each sized to accept an additional contact therein.

11. The connector assembly of claim 1, wherein at least a portion of the female housing is made of a transparent material.

12. A connector assembly comprising:
    a male housing having a rigid tubular projection with an interior surface defining a longitudinal passageway;
    a first contact assembly mounted within the passageway of the male housing;
    a female housing having an interior surface defining a longitudinal passageway and an opening thereto;
    a second contact assembly mounted within the passageway of the female housing;
    a tubular resilient sleeve having an interior surface defining a longitudinal passageway between a first opening and a second opening, the sleeve being deformable from a resting position wherein the passageway is open and a collapsed position wherein the passageway is closed, wherein in the resting position, the passageway of the sleeve being sized to accept the end of the first contact assembly therein, the sleeve being mounted adjacent to the passageway of the female housing to allow the first contact assembly to pass into the sleeve and connect with the second contact assembly upon the interconnection of the male and female housings; and
    a leaf spring mounted adjacent to the passageway of the female housing, the leaf spring being configured to bias the sleeve toward the collapsed position to seal the passageway therethrough, the leaf spring also being located to be interferingly engaged by tubular projection of the male housing, such that upon the connection of the male and female housings, the projection forces the leaf spring to release from engagement of the sleeve, whereupon the sleeve deforms to the resting position.

13. The connector assembly of claim 12, wherein the first and second contacts are electrical contacts.

14. The connector assembly of claim 12, wherein the first and second contacts are fiber optic contacts.

15. The connector assembly of claim 12, wherein the leaf spring includes two leaves having ends in opposed relation to each other to compress the sleeve therebetween.

16. The connector assembly of claim 12, wherein the female housing includes two portions configured to engage each other and releasably hold the spring therein.

17. The connector assembly of claim 16, wherein the spring includes two leaves having ends in opposed relation to each other to compress the sleeve therebetween, each leaf mounted on an arm of the spring, the arms being located in opposed diverging relation and separated such that the arms are compressed upon the insertion of the spring into the female housing.

18. The connector assembly of claim 12, wherein the leaf spring closes the passageway of the sleeve at a location adjacent to the opening of the sleeve that accepts the first contact therein.

19. The connector assembly of claim 12, wherein the female housing further includes an internal cylindrical support surface located concentrically inside of the sleeve and extending partially along the length of the internal passageway of the sleeve, to prevent the deformation of that portion of the sleeve.

20. The connector assembly of claim 12, wherein:

the sleeve has an oval configuration; and the interior surfaces of the male and female housings are each sized to accept the end of an additional contact therein.

21. The connector assembly of claim 12 wherein one of the contact assemblies is mounted in an insulator configured to slide inside one of the housings.

22. The connector assembly of claim 12, wherein at least a portion of the female housing is made of a transparent material.

23. A connector assembly comprising:

a male housing having a rigid tubular projection with an interior surface defining a longitudinal passageway;

a first contact assembly mounted within the passageway of the male housing;

a female housing having an interior surface defining a longitudinal passageway and an opening thereto;

a second contact assembly mounted within the passageway of the female housing;

a tubular resilient sleeve having an interior surface defining a longitudinal passageway between a first opening and a second opening, the sleeve being deformable from a resting position wherein the passageway is open and a collapsed position wherein the passageway is closed, wherein in the resting position, the passageway of the sleeve being sized to accept the end of the first contact assembly therein, the sleeve being mounted adjacent to the passageway of the female housing to allow the first contact assembly to pass into the sleeve and connect with the second contact assembly upon the interconnection of the male and female housings;

a leaf spring mounted adjacent to the passageway of the female housing, the leaf spring having two leaves with two ends in opposed relation to each other with the sleeve located therebetween, thereby biasing the sleeve toward the collapsed position to seal the passageway therethrough, the leaf spring also being located to be interferingly engaged by tubular projection of the male housing, such that upon the connection of the male and female housings, the projection forces the leaf spring to release from engagement of the sleeve, whereupon the sleeve deforms to the resting position; and wherein the female housing further includes an internal cylindrical support surface located concentrically inside of the sleeve and extending partially along the length of the internal passageway of the sleeve, to prevent the deformation of that portion of the sleeve.

* * * * *